Sept. 8, 1964    R. L. VAUGHN    3,147,667
HIGH SPEED MACHINING APPARATUS AND METHOD
Filed April 13, 1959    2 Sheets-Sheet 1
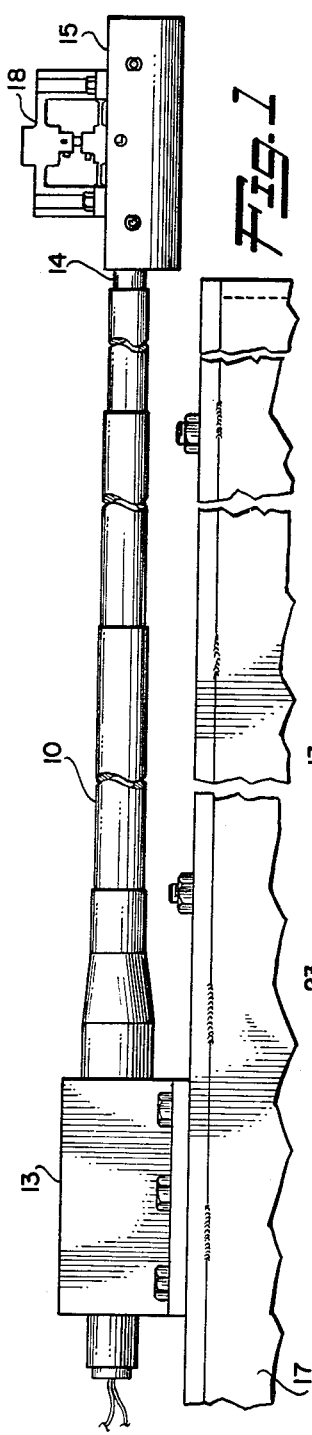
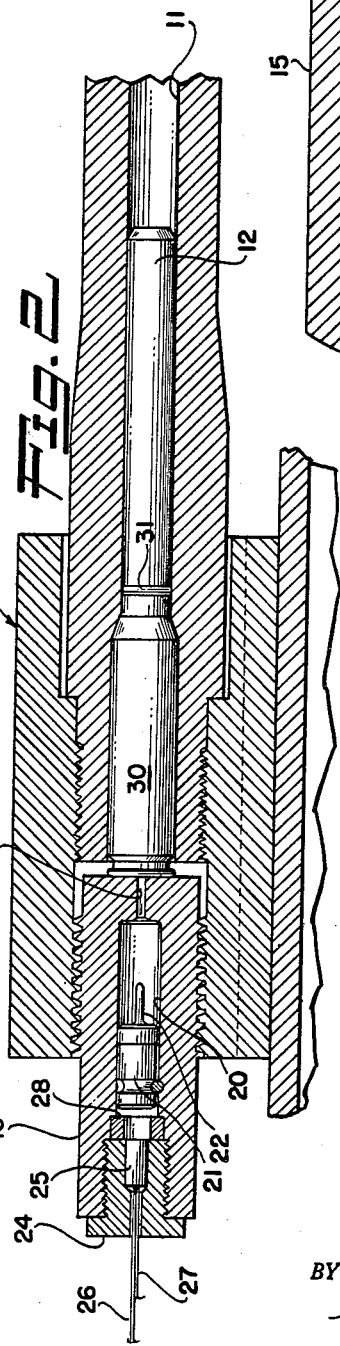
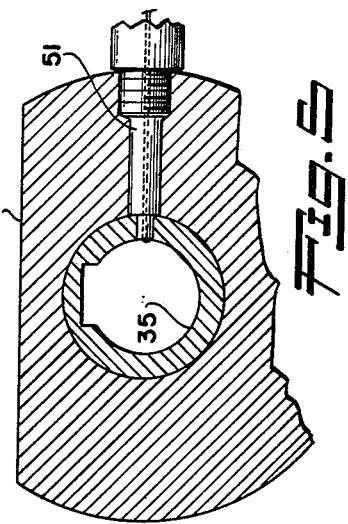
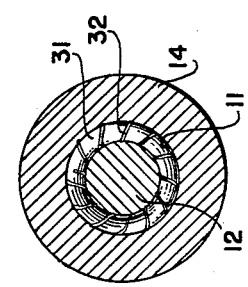
*INVENTOR.*
ROBERT L. VAUGHN
BY
*George C. Sullivan*
Agent Sept. 8, 1964
R. L. VAUGHN
3,147,667
HIGH SPEED MACHINING APPARATUS AND METHOD
Filed April 13, 1959
2 Sheets-Sheet 2
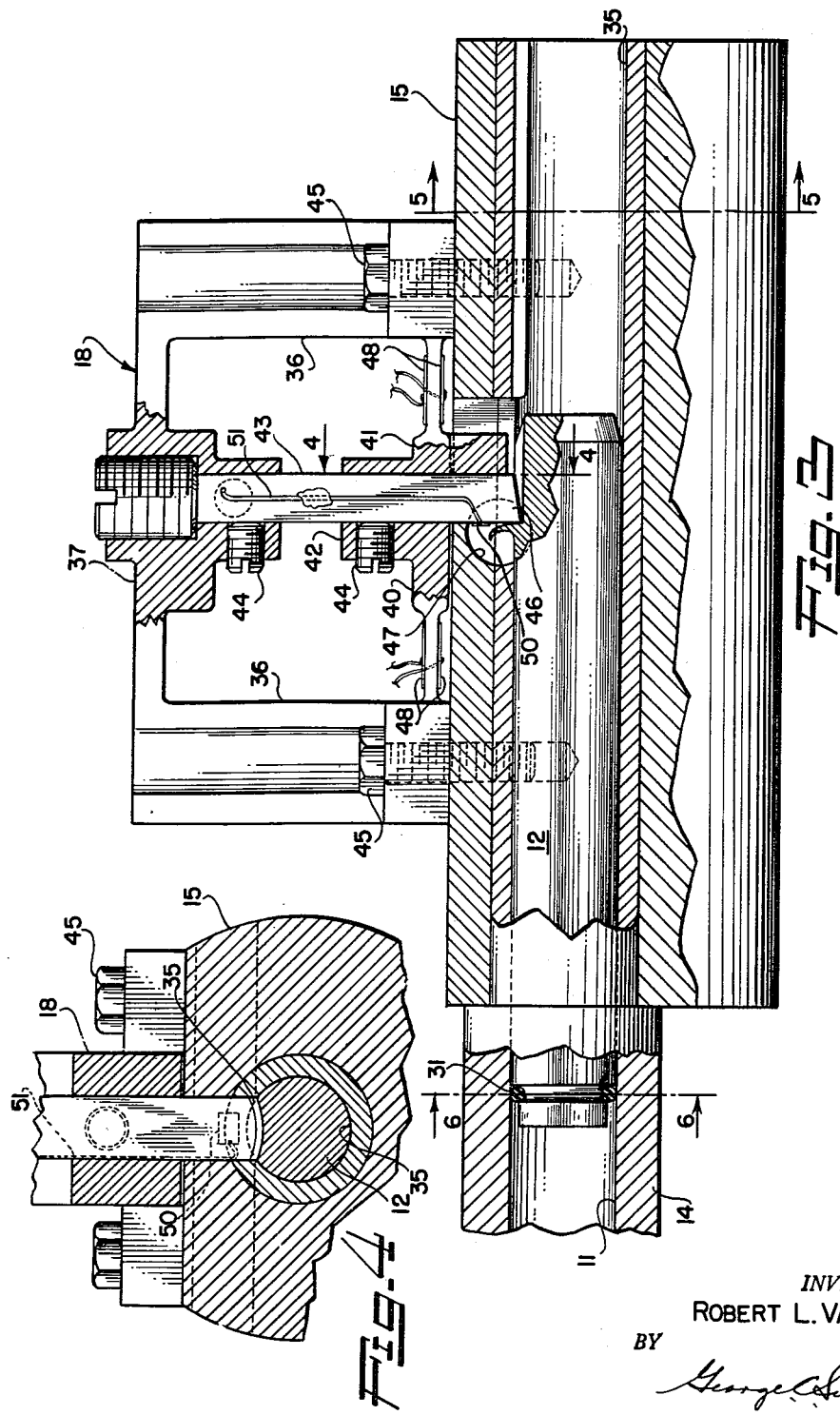
INVENTOR.
ROBERT L. VAUGHN
BY
George C. Sullivan
Agent

United States Patent Office

3,147,667
Patented Sept. 8, 1964

3,147,667
HIGH SPEED MACHINING APPARATUS AND METHOD
Robert L. Vaughn, Granada Hills, Calif., assignor to Lockheed Aircraft Corporation, Burbank, Calif.
Filed Apr. 13, 1959, Ser. No. 806,050
3 Claims. (Cl. 90—24)

This invention relates to high speed machining and more particularly to a method and apparatus for machining a workpiece of high strength material at extremely high velocities.

In the past, it has been the usual procedure to machine a workpiece employing such conventional equipment as lathes, grinders, mills, rotary cutters, etc. These machines have been found extremely useful in cutting or shaping material which is relatively soft, such as aluminum for example, but, these machines have not been found suitable and/or economical for cutting or shaping relatively high strength materials such as steel, stainless steel, titanium and other hard materials. These conventional machines have been shown to be ineffective in shaping or cutting such materials for the reason that these machines are incapable of developing sufficient cutting or shaping tool speed to prevent tool breakage, tool jamming with the workpiece or otherwise damaging both tool and workpiece, and in some cases the machine itself.

The present invention obviates difficulties and disadvantages associated with conventional machining equipment by employing an explosive actuated tool for performing machine operations on high strength materials at surface speeds ranging from 10,000 to 360,000 surface feet per minute. The precise speed depending upon the material, depth, configuration of cut to be taken, etc. The device of the present invention includes in general, a breech mechanism or other suitable assembly for containing a powder charge and a workpiece, a barrel or channel through which the workpiece is propelled upon the ignition of the powder charge and a fixture mounted at the end of the barrel or channel for holding a cutting or shaping tool in such a manner that the workpiece passes the tool and thus generates the cut or otherwise alters the workpiece shape. The workpiece propellant may be a charge of gun powder or other suitable propellant in the breech mechanism. The workpiece is propelled at ballistic speed, that is, at a speed comparable to that of a bullet or similar projectile. A further feature resides in the present invention which includes an arrangement for mounting and supporting various test fixtures such that impact properties of various tool materials and/or workpieces can be determined. These properties include such features as velocity for force calculations, camera studies and temperature readings for example.

Therefore, it is an object of the present invention to provide a method and apparatus for shaping or cutting a workpiece which is composed of relatively high strength material such as steel or stainless steel, for example, at relatively high velocities. The invention discloses means for propelling the workpiece past a stationary or static cutting tool in order to generate the cut to be taken. It is another object of the present invention to provide an apparatus for machining high strength materials whereby the problem of chip disposal and removal is greatly simplified, if not completely eliminated.

Another object of the present invention is to provide a novel means and method for cutting or shaping high strength materials whereby various measurements relating to cutting forces, temperature, velocity and camera studies can be taken without jeopardizing or altering the intended cut to be generated by engagement of the workpiece and cutter. These studies can be used for a better understanding of the dynamic behavior of metals.

These and other objects will be more readily described and understood with reference to the accompanying drawings wherein;

FIGURE 1 is a side elevational view of the apparatus of the present invention showing the barrel having a breech mechanism on one end and a tool holding fixture on its opposite end;

FIGURE 2 is a sectional view of the breech mechanism employed in the apparatus of FIGURE 1 illustrating the firing mechanism and the workpiece projectile;

FIGURE 3 is a sectional view of the tool holder and muzzle fixture employed in the apparatus of FIGURE 1 including means for deriving measurements during the actual cutting operation;

FIGURE 4 is a partial cross sectional view of the tool holder and muzzle fixture taken in the direction of arrows 4—4 of FIGURE 3 showing the cutting edge of the tool and the cut being taken in the workpiece projectile; this cut can vary in configuration depending on cutter geometry;

FIGURE 5 is a cross sectional view of the muzzle fixture taken in the direction of arrows 5—5 of FIGURE 3; and FIGURE 6 is a cross sectional view of the barrel and workpiece projectile taken in the direction of arrows 6—6 of FIGURE 3 showing the sealing means carried by the workpiece projectile.

With reference to FIGURES 1 and 2, a high speed machining apparatus in accordance with the present invention is shown which may be said to comprise in general, a barrel 10 having an internal bore 11 through which a workpiece projectile 12 travels. The projectile progresses from a breech support 13 through the bore 11 of barrel 10 towards the muzzle end 14 of the barrel into an enclosed muzzle fixture 15 and then progresses exteriorly of the apparatus. The forward movement of the workpiece projectile may be arrested by any suitable means such as by employing a sandpit or employing a box containing high viscosity silicon fluid or other silicon gums or Celotex sheets arranged side-by-side for example. The breech support 13 is employed to suitably mount a breech mechanism 16 and one end of the barrel 10 on a bed or table 17. This arrangement shows the barrel 10 including the muzzle fixture and a tool holder 18 as being unsupported or cantilevered from the breech support 13. A support can be designed and used if necessary.

As shown in FIGURE 2, the breech assembly includes an internal bore 20 which receives a piston 21 having a firing pin 22 in alignment with and arranged to pass through a reduced bore 23 communicating with bore 20. Sealing the end of the breech 16, there is employed a threaded plug 24 which is provided with a recess for receiving an explosive squid 25 which may be fired electrically via electrical leads 26 and 27. The gases generated by the ignition of the squid 25 pass through an internal bore of a spacer 28 into bore 20 which activates the piston to move forward within bore 20 forceably engaging the firing pin 22 with the cap of a conventional cartridge 30.

Cartridge 30 is of the usual type wherein the cap initiates the explosion of powder contained within the cartridge which forces a projectile carried on the end of the cartridge through the barrel. In the present instance, projectile 12 is press fitted into the end of the cartridge and adjacent the end of the cartridge, projectile 12 is provided with an annular O ring seal which travels with the projectile through the bore 11 of the barrel and effectively prevents the escape of actuating gases from around the periphery of the projectile. As shown more clearly in FIGURE 6, seal 31 is provided with a helical copper wire 32. The copper wire helix around the O ring seal is employed to insure adequate grounding of the projectile during its passage through the muzzle fixture 15. Although the helix is not necessary for normal machining operations, it is extremely important in the event velocity or other instrumentation measurements are to be taken on a projectile during test or setup conditions, since the gun apparatus is common ground for electrical instrumentation circuits.

Although the projectile 12 is shown as being cylindrical or tube-like, it is to be understood that the workpiece projectile may take the form of any desirable configuration. In fact, the workpiece projectile can be hollow as well as solid as shown. Furthermore, the end of the projectile may be flat, tapered or formed to other desirable configurations.

With reference to FIGURE 3, the muzzle end 14 of the barrel 10 is shown having attached thereto a muzzle fixture 15 which is provided with a bore 35 which is co-axial with bore 11 of the barrel. Mounted on top of the muzzle fixture, there is provided the tool or cutter holder 18 which comprises a pair of supports 36 joined on top to a common body section 37 and joined near their bottoms by links or connections 40 and 41 to a second main body portion 42. The body portions 37 and 42 of the tool or cutter holder are provided with a common co-axial bore for receiving and holding a work tool 43 such as a cutting tool. The tool is held in position by means of retaining screws 44 associated with both body portions 37 and 42. The entire tool or cutter holder assembly is mounted on the muzzle fixture 15 by means of bolts 45. The muzzle fixture 15 is provided with a bore co-axial with the bores in body sections 37 and 42 of the tool or cutter holder through which the tool or cutter 43 projects its cutting, impacting or shaping edge 46. The tip 46 or cutting, impacting, forming portions of the tool projects into bore 35 of the muzzle fixture so that it will interfere with the forward travel of the workpiece projectile. As shown in FIGURE 3, the workpiece projectile is progressing past the cutting edge 46 of the tool so that that portion of the workpiece which engages with the tool is being severed, impacted or separated from the main body of the workpiece and is generally referred to as a "chip." In order to make camera studies of the actual impacting, forming or cutting operation, an aperature 47 has been provided which runs through the muzzle fixture 15 so that the aperature cuts through a portion of the bore 35 to expose the tool cutting portion 46 and the projectile. Aperture 47 also provides for chip collection in low velocity cutting or forming. However, it has been found when extremely high velocities are employed and that very light cuts are produced the chip burns, disintegrates, or vaporizes upon the impact with the cutting tool and in these instances, all chips and chip material are automatically eliminated.

In order to measure vertical and horizontal stress and strains on the cutting tool, and in general any force components resulting from the work being done, it has been found desirable to employ strain gage bridge arrangements on the links 40 and 41 of the tool holder. Strain gages 48 may be arranged in any suitable fashion on the tool holder such as by bonding bridges or legs of bridges to either side of the links 40 or 41.

In order to determine tool chip temperature, it has been found desirable to employ a thin foil or foils, attached to various points of interest—either as shown or embedded within the tool, of material 50 in close proximity to the chip 46 and to employ the foil 50 and a lead wire 51 as one wire of thermal couple which is lead to an exterior cold junction (not shown).

For velocity measurements, it is noted in FIGURES 1 and 5 that the muzzle fixture is provided with a pair of aperatures 52 which receive probes leading to velocity measuring equipment. The pair of aperatures are located on opposite sides of the cutting tool and lead from bore 35 exteriorly of the muzzle fixture. For this measurement, it is noted that the helix 32 carried on the seal 31 of the workpiece projectile grounds the projectile for such tests. For various instrumentation circuitries there is no limit to the number of apertures that can be used. These apertures (circuitry contactors) may be spaced radially around the muzzle fixture progressing from front to back as needed.

In actual operation, a cutting tool having a predetermined shape and configuration to which the workpiece projectile is to be conformed is slid into the bores in body portions 37 and 42 of the tool or cutter holder 18 and fixed in place by means of screws 44. The tool cutting or altering portion 46 is arranged to interfere with the travel path of the projectile within bore 11 of barrel 10. However, the tool is arranged in this manner so as to permit the passage of at least some portion of the projectile.

Next, the breech mechanism is removed to expose the loading portion of the barrel and the workpiece projectile including the cartridge to which it is attached is inserted into bore 11 of the barrel. The plug 24 of the breech mechanism 16 is removed so that an initiating squib 25 can be installed and the plug is inserted into the breech mechanism followed by the insertion of the breech mechanism into the breech mounting or support 13. Upon the electrical firing of the squib 25, the piston 21 is driven forward in bore 20 so that the firing pin 22 travels through reduced bore 23 and into engagement with the cap of the cartridge 30. Although the present illustrations show the projectile as being detachably secured to the cartridge, it should be appreciated that any suitable pyrotechnic device may be employed which when ignited causes explosive gases to expand driving the projectile through the bore of the barrel. Therefore, whether the projectile is carried by a cartridge or just arranged in close proximity of the explosive charge is a matter of choice. The impact of the firing pin with the cap causes an explosive charge within the cartridge to propel the workpiece projectile through the bore 11 of barrel 10 in a direction of the fixed cutting tool 43. The bore 11 serves as a guide for the projectile and, therefore, determines the path of projectile travel.

Inasmuch as the forming portion 46 of the tool 43 is intentionally arranged in the path of a projectile, the projectile strikes the cutting tool and its configuration is altered to the configuration of the tool as the projectile passes through the bore 11 driven by the propelling gases from the exploded cartridge. The removed chips are either collected within aperture 47 or as noted above, completely disintegrated.

As the workpiece projectile forceably engages the tool 43, measurements as to tool temperature and vertical and horizontal strains and stresses are calculated for evaluation purposes. As the projectile passes probes inserted in apertures 51, velocity readings for determining force calculations are derived.

Upon the workpiece projectile leaving the bore 11 of barrel 10, a stop box or other suitable stopping means for the projectile is employed so that the workpiece projectile may be recovered in its altered condition as determined by the tool. However, the stop means for the projectile must be such that the forward motion of the projectile may be stopped relatively abruptly without further alteration to the workpiece.

Having described only a typical form of the invention I do not wish to be limited to the specific details herein set forth, but wish to reserve to myself any variations or modifications that may appear to those skilled in the art and fall within the scope of the following claims.

I claim:

1. The method of machining a workpiece at ultra-high speeds, comprising the steps of:

(*a*) providing a travel path for support of the workpiece which is predetermined and lineal, (*b*) inserting a cutting tool into the travel path of the workpiece so that a portion of the cutting tool interferes with the travel of the workpiece along the path, (c) propelling the workpiece along the travel path at ballistic speed so that a portion of the workpiece forcibly strikes the portion of the cutting tool arranged in the path of the workpiece, so that the workpiece is machined as it passes the tool at speeds of from 10,000 to 360,000 surface feet per minute.

2. The method of machining a workpiece at ultra-high speeds, comprising the steps of:

(a) placing a workpiece within one end of an elongated lineal passageway having a uniform cross section open at each end and which supports the workpiece in a tight sliding fit, (b) inserting a cutting tool within said passageway adjacent the other end thereof, so that its cutting edge will project into said passageway to interfere with the workpiece when it passes the tool in its travel along the passageway, (c) propelling said workpiece along the passageway at ballistic speed toward the cutting tool, so that the workpiece strikes the cutting edge of the tool and is machined thereby at speeds of from 10,000 to 360,000 surface feet per minute as it passes the tool.

3. The method of machining a workpiece at ultra-high speeds, comprising the steps of:

(a) placing a workpiece within one end of an elongated lineal passageway having a uniform cross section open at each end, and which engages the periphery of the workpiece in a tight sliding fit, (b) inserting a cutting tool within said passageway adjacent the open end thereof, so that its cutting edge will project into said passageway to interfere with the workpiece when it passes the tool in its travel along the passageway, (c) placing a propelling means behind said workpiece which is capable of moving the workpiece along the passageway at a ballistic speed, (d) activating said propelling means to move said workpiece along the passageway toward the cutting tool at a ballistic speed so that the workpiece strikes the cutting edge of the tool and is machined thereby at speeds ranging from 10,000 to 360,000 surface feet per minute as the workpiece passes the tool.

References Cited in the file of this patent

UNITED STATES PATENTS

| | | | |
|---|---|---|---|
| 166,337 | Brown | Aug. 3, | 1875 |
| 262,375 | Cosgrove | Aug. 8, | 1882 |
| 599,472 | Nobel | Feb. 22, | 1898 |
| 2,276,259 | Temple | Mar. 10, | 1942 |
| 2,315,476 | Groene | Mar. 30, | 1943 |
| 2,320,750 | Raiche | June 1, | 1943 |
| 2,581,645 | Frieder et al. | Jan. 8, | 1952 |
| 2,926,565 | Thorness | Mar. 1, | 1960 |
| 3,024,531 | Haskell et al. | Mar. 13. | 1962 |